US009949050B2

(12) United States Patent
Dokmanic et al.

(10) Patent No.: US 9,949,050 B2
(45) Date of Patent: Apr. 17, 2018

(54) CALIBRATION METHOD AND SYSTEM

(71) Applicant: Ecole Polytechnique Federale de Lausanne (EPFL), Lausanne (CH)

(72) Inventors: Ivan Dokmanic, Lausanne (CH); Laurent Daudet, Paris (FR); Martin Vetterli, Grandvaux (CH)

(73) Assignee: Ecole Polytechnic Federale De Lausanne (EPFL) (CH)

( * ) Notice: Subject to any disclaimer, the term of this patent is extended or adjusted under 35 U.S.C. 154(b) by 332 days.

(21) Appl. No.: 14/195,321

(22) Filed: Mar. 3, 2014

(65) Prior Publication Data
US 2015/0181360 A1    Jun. 25, 2015

(30) Foreign Application Priority Data

Dec. 20, 2013  (WO) ................. PCT/EP2013/077694

(51) Int. Cl.
*H04R 29/00*  (2006.01)
*G01B 5/00*  (2006.01)
(Continued)

(52) U.S. Cl.
CPC ............. *H04R 29/005* (2013.01); *G01B 5/00* (2013.01); *G01C 15/00* (2013.01); *G01H 7/00* (2013.01); *G01S 7/539* (2013.01); *G01S 7/54* (2013.01); *G01S 15/06* (2013.01); *G01S 15/42* (2013.01); *G01S 15/46* (2013.01); *G01S 15/876* (2013.01); *G01S 17/06* (2013.01); *H04R 1/08* (2013.01); *H04S 7/305* (2013.01); *G01S 2015/465* (2013.01)

(58) Field of Classification Search
CPC .................................. G01S 15/08; G01S 3/80
USPC ...................... 381/303, 95; 367/129, 99, 118
See application file for complete search history.

(56) References Cited

U.S. PATENT DOCUMENTS 6,329,908 B1 *  12/2001  Frecska ................ G08B 3/1083
                                                      340/384.7
2003/0119523 A1    6/2003  Bulthuis
(Continued)

FOREIGN PATENT DOCUMENTS

EP        2410769        1/2012
WO   WO/2011/145030    11/2011

OTHER PUBLICATIONS

International Search Report (PCT/EP2013/077694) dated Mar. 28, 2014, 6 pages.
(Continued)

*Primary Examiner* — Vivian Chin
*Assistant Examiner* — Ubachukwu Odunukwe
(74) *Attorney, Agent, or Firm* — Blank Rome LLP

(57) ABSTRACT

The present invention concerns a method for calibrating an array of receivers ($r_j$), each receiver being configured for receiving a signal transmitted by at least one transmitter ($s_i$), and echoes of the transmitted signal as reflected by one or more reflective surfaces (w), said method comprising the following steps:
sorting said echoes, by assigning each echo to a reflective surface or to a combination of reflective surfaces (w)
calibrating said array of receivers ($r_j$) based on said sorting.

18 Claims, 4 Drawing Sheets

(51) Int. Cl.

| G01C 15/00 | (2006.01) |
|---|---|
| G01H 7/00 | (2006.01) |
| G01S 7/539 | (2006.01) |
| G01S 7/54 | (2006.01) |
| G01S 15/87 | (2006.01) |
| H04S 7/00 | (2006.01) |
| G01S 15/46 | (2006.01) |
| G01S 15/06 | (2006.01) |
| G01S 15/42 | (2006.01) |
| G01S 17/06 | (2006.01) |
| H04R 1/08 | (2006.01) |

(56) References Cited

U.S. PATENT DOCUMENTS

| 2011/0317522 | A1* | 12/2011 | Florencio | G01S 3/8006 367/129 |
|---|---|---|---|---|
| 2012/0044786 | A1* | 2/2012 | Booij | H04B 11/00 367/127 |
| 2013/0064042 | A1* | 3/2013 | Aarts | G01S 15/89 367/99 |
| 2015/0036848 | A1* | 2/2015 | Donaldson | H04S 7/303 381/303 |

OTHER PUBLICATIONS

Written Opinion of the International Searching Authority (PCT/EP2013/077694), 9 pages.
International Preliminary Report on Patentability (PCT/EP2013/077694) dated Jun. 23, 2015, 10 pages.
Flavio Riberio, "Geometrically Constrained Room Modeling with Compact Microphone Arrays"; 13 pages.
Fabio Antonacci et al., "Inference of Room Geometry from Acoustic Impulse Responses"; Journal of Class Files, vol. 6, No. 1, Jan. 2012, 14 pages.
Sakari Tervo et al., "3D Room Geometry Estimation From Measured Impulse Responses", ICASSP 2012, pp. 513-516.
V. C. Raykar et al., "Automatic Position Calibration of Multiple Microphones," IEEE, 2004, pp. IV-69-IV-72.
A. Amar et al., "Extending the Classical Multidimensional Scaling Algorithm Given Partial Pairwise Distance Measurements," IEEE Signal Processing Letters, vol. 17, No. 5, May 2010, pp. 473-476.
I. Dokmanic et al., "Indoor Calibration," Dec. 16, 2013, pp. 1-4.
P. H. Schonemann, "On Metric Multidimensional Unfolding," Psychometrika, vol. 35, No. 3, Sep. 1970, pp. 349-366.
S. T. Birchfield et al., "Microphone Array Postition Calibration by Basis-Point Classical Multidimentional Scaling," IEEE Transactions on Speech and Audio Processing, vol. 13, No. 5, Sep. 2005, pp. 1025-1034.
S. D. Valente et al., "Geometric Calibration of Distributed Microphone Arrays from Acoustic Source Correspondences," IEEE, 2010, pp. 13-18.
I. McCowan et al., "Microphone Array Shape Calibration in Diffuse Noise Fields," IEEE Transactions on Audio, Speech, and Language Processing, vol. 16, No. 3, Mar. 2008, pp. 666-670.
M. Crocco et al., A Bilinear Approach to the Position Self-Calibration of Multiple Sensors, IEEE Transactions on Signal Processing, vol. 60, No. 2, Feb. 2012, pp. 660-673.
S. Thrun, "Affine Structure From Sound," 2005, 8 pages.
F. Jacob et al., "Microphone Array Position Self-Calibration from Reverberant Speech Input," International Workshop on Acoustic Signal Enhancement 2012, Sep. 4-6, 2012, 4 pages.
J. M. Sachar et al., "Microphone Position and Gain Calibration for a Large-Aperture Microphone Array," IEEE Transactions on Speech and Audio Processing, vol. 13, No. 1, Jan. 2005, pp. 42-52.
M. Pollefeys et al., "Direct Computation of Sound and Microphone Locations from Time-Difference-of-Arrival Data," IEEE International Conference on Acoustics, Speech, and Signal Processing, 2008, 4 pages.
N. D. Gaubitch et al., "Auto-Localization in AD-HOV Microphone Arrays," IEEE International Conference on Acoustics, Speech, and Signal Processing, 2013, pp. 106-110.
M. Crocco et al., A Closed Form Solution to the Microphone Position Self-Calibration Problem, IEEE International Conference on Acoustics, Speech, and Signal Processing, 2012, pp. 2597-2600.

* cited by examiner

CALIBRATION METHOD AND SYSTEM

This application claims priority to International Patent Application No. PCT/EP2013/077694, filed on Dec. 20, 2013, which is hereby incorporated fully by reference.

FIELD OF THE INVENTION

The present invention concerns a calibration method and system, in particular a position calibration method and system for an array of receivers, e.g. an array of microphones. By duality, the present invention concerns also position calibration method and system for an array of sources or transmitters, e.g. an array of loudspeakers.

DESCRIPTION OF RELATED ART

Array of receivers, e.g. array of microphones, are used in many applications, including the localization of a speaker, speech recognition, teleconferencing, etc.

Recently, mobile devices as smartphones, tablets, etc., have been used for building such array of receivers, as each mobile device comprises a receiver. In particular, the array of such receivers is called an "ad-hoc" array of receivers.

The knowledge of the absolute or relative location of the receivers is important for improving the quality of the data processing in the mentioned applications. The calibration of an array of receivers allows then to find the absolute or the relative location of the receivers in an array of receivers.

Currently there are two big groups of applications for these calibration methods.

The first group concerns the position calibration of an ad-hoc array of receivers, e.g. an array of smartphones. The position calibration of an ad-hoc array of receivers allows then to learn their relative geometry.

Known methods of position calibration of an ad-hoc array of receivers can perform the calibration completely blindly, i.e. by using an unknown signal transmitted by the source(s) or transmitter(s). In other words, the position of the source(s) is unknown. In this case, the calibration of the array of receivers is usually integrated with the transmitter localization. Some of these known methods can also handle unknown offset times and internal delays.

The second group of applications concerns very large, fixed array of receivers, i.e. array of receivers comprising more than 10, e.g. several tens of microphones, or ever hundreds or thousands of receivers. In this case precise measurements of the microphone positions become too complicated, or impossible.

N. D. Gaubitch, W. B. Kleijn, and R. Heusdens, "*Auto-localization in ad-hoc microphone arrays*", in Acoustics, Speech and Signal Processing (ICASSP), 2013, IEEE International Conference on, IEEE, 2013, pp. 106-110 describes a calibration method wherein the position of the source(s) in unknown, and which can also handle unknown offset times and internal delays. It describes a method for automatic microphone localization in ad-hoc microphone arrays, based on time-of-arrival (TOA) measurements obtained from spatially distributed acoustic events.

Vikas C. Raykar and Ramani Duraiswami, "*Automatic Position Calibration of multiple microphones*", in Acoustics, Speech and Signal Processing (ICASSP), 2004 Montreal, Canada, May 2004, vol. IV, pp. 69-72 describes a method to automatically determine the relative three dimensional positions of multiple microphones using at least five loudspeakers in unknown positions, under the assumption that there is microphone which is very close to a loudspeaker.

Stanley T. Birchfield and Amarnag Subramanya, "*Microphone Array Position Calibration by Basis-Point Classical Multidimensional Scaling*", IEEE TRANSACTIONS ON SPEECH AND AUDIO PROCESSING, VOL. 13, NO. 5, SEPTEMBER 2005, pp 1025-1034 describes the use of the multidimensional scaling (MDS) for finding coordinates of points given their inter-point distances. The described algorithm allows to calibrate an array of microphones with a tape measure. The algorithm can be extended so as to handle the case when many of the distances are unavailable, thus yielding a technique that is practical for microphone arrays with a large number of microphones. If there are four synchronized sound sources, the algorithm can be used for automatic calibration via time-delay estimation.

Sebastian Thrun, "*Affine Structure From Sound*", Proceedings of Conference on Neural Information Processing Systems (NIPS), 2005 describes a method for the calibration of ad-hoc microphone arrays and sensor networks, allowing to recover also the locations and emission times of the acoustic events. An assumption made is that the sources are in the far field of the microphones.

M. Pollefeys and D. Nister, "*Direct computation of sound and microphone locations from time-difference-of-arrival data,*" in IEEE Int. Conf. on Acoustic, Speech, and Signal Processing, 2008, pp. 2445-2448 describes a method for directly recovering the location of both microphones and sound sources from time-difference-of-arrival measurements only.

Alon Amar, Yiyin Wang, and Geert Leus, "*Extending the Classical Multidimensional Scaling Algorithm Given Partial Pairwise Distance Measurements*", IEEE SIGNAL PROCESSING LETTERS, VOL. 17, NO. 5, MAY 2010, pp. 473-476 describes a calibration method for a sensor network composed of a fully connected group of nodes that communicate with each other, and a group of nodes that cannot communicate with each other, but each one of them communicates with each node in the first group. The described method allows to localize the fully connected nodes by exploiting their distance measurements to the disconnected nodes, and the positions of the disconnected nodes.

S. D. Valente, M. Tagliasacchi, F. Antonacci, P. Bestagini, A. Sarti, S. Tubaro, "*Geometric calibration of distributed microphone arrays from acoustic source correspondences*", MMSP, page 13-18, IEEE, (2010) describes a method for the geometric calibration of multiple microphone arrays. Each array is controlled by a separate acquisition device, and the acquisition devices do not share a common synchronization dock. Given a set of probing sources, e.g. loudspeakers, each array computes an estimate of the source locations using a Time Difference of Arrival (TDOA) based algorithm. The method allows to estimate the position and pose of one array with respect to the others, Florian Jacob, Joerg Schmalenstmeer, Reinhold Haeb-Umbach, "*Microphone Array Position Self-calibration from Reverberant Speech Input*", International Workshop on Acoustic Signal Enhancement 2012, 4-6 Sep. 2012, Aachen describes a method for retrieving the geometry of an acoustic sensor network consisting of spatially distributed microphone arrays from unconstrained speech input. The calibration relies on Direction of Arrival (DoA) measurements which do not require a dock synchronization among the sensor nodes.

Iain McCowan, Mike Lincoln, and Ivan Himawan, "*Microphone Array Shape Calibration in Diffuse Noise*

*Fields", IEEE TRANSACTIONS ON AUDIO, SPEECH, AND LANGUAGE PROCESSING*, VOL. 16, NO. 3, MARCH 2008, pp. 666-670 describes a microphone array shape calibration method for diffuse noise environments. The method estimates inter-microphone distances by fitting the measured noise coherence with its theoretical model and then estimates the array geometry using multidimensional scaling.

Joshua M. Sachar, Harvey F. Silverman, and William R. Patterson, *"Microphone Position and Gain Calibration for a Large-Aperture Microphone Array", IEEE TRANSACTIONS ON SPEECH AND AUDIO PROCESSING, VOL. 13, NO. 1*, JANUARY 2005, pp. 42-52 describes a method for determining both the coordinates in three-dimensions for the position of each microphone and the individual gains of each microphone/microphone channel in a microphone array.

M. Crocco, A. Del Bye, M, Bustreo, and V, Marino, *"A Closed Form Solution to the Microphone Position Self-Calibration Problem," in 37th International Conference on Acoustics, Speech, and Signal Processing (ICASSP 2012)*, Kyoto, Japan, 2012 describes a method for the automatic 3D localization of a set of microphones in an unknown environment. Given the times of arrival at each microphone of a set of sound events, the described method simultaneously estimates the 3D positions of the sensors and the sources that have generated the events, under the assumption that the emission time of the sound events is known in order to measure the time of flight for each event.

Peter H. Schönemann, *"On Metric Multidimensional Unfolding", Psychometrika—Vol.* 35, No. 3, September, 1970 describes a method for locating two sets of points in a joint space, given the distances between elements from distinct sets.

Marco Crocco, Alessio Del Bene and Vittorio Murino, *"A Bilinear Approach to the Position Self-Calibration of Multiple Sensors", IEEE TRANSACTIONS ON SIGNAL, PROCESSING, VOL.* 60, NO. 2, FEBRUARY 2012, pp. 660-673 describes another method for the automatic 3D localization of a set of sensors in an unknown environment, estimating the 3D position of the sensors and the sources that have generated the event.

All of the methods in the literature are designed to work in anechoic conditions or in free space. If there is a surrounding room, they only use the direct path, and discard the echoes—reverberation is even considered detrimental.

It is an aim of the present invention to improve the existing calibration methods when they are performed in a space containing of one or more reflective surfaces.

It is an aim of the present invention to reduce the number of sources (or, by duality, the number of receivers) required by the existing calibration methods.

BRIEF SUMMARY OF THE INVENTION

According to the invention, these aims are achieved by means of a method for calibrating an array of receivers, each receiver being configured for receiving a signal transmitted by at least one transmitter, and echoes of the transmitted signal as reflected by one or more reflective surfaces, said method comprising the following steps:

sorting said echoes, by assigning each of said echoes to one reflective surface or to a combination of reflective surfaces calibrating said array of receivers based on said sorting.

The presence of one or more reflective surfaces is not considered detrimental. On the contrary, it is exploited for facilitating the calibration, even if geometry and the shape of the room are unknown, the location of the transmitter(s) is unknown and the location of the array of receivers is unknown as well.

In one preferred embodiment, the echoes comprise first-order echoes and higher-order echoes. If the echo is a higher-order echo, it does not correspond to a single reflective surface but, rather, to a combination of reflective surfaces, In one preferred embodiment, "assigning each of said echoes to one reflective surface or to a combination of reflective surfaces" means "assigning each of said echoes to an image source".

In one embodiment facilitating the calibration means reducing the number of the (real and concrete) sources required for performing this calibration, by exploiting the presence of the virtual sources generating the mentioned echoes.

In one embodiment, at least one of the following parameters is known: the location and/or the orientation of the reflective surfaces, the location of the source, and the location of at least one receiver of the array of receivers. This knowledge will simplify the computations performed by the calibration method.

In one embodiment this echoes sorting is an echoes labelling, and comprises:

selecting a set of echoes from the echoes as received by the receiver assigning each echo of the set to a reflective surface or to a combination of reflective surfaces.

In fact in one embodiment only the echoes received by the array of receivers in a first temporal window are considered, regardless their order.

In another embodiment, a second temporal window will be used so as to reduce the number of combinations for echo sorting. That second window can depend on the largest dimension of the array of receivers.

In one embodiment, the method according to the invention comprises the following steps:

selecting a calibration module among a number of calibration modules running said calibration module for all the echoes' assignments calculating for each running a fit parameter selecting an echoes' assignment on the basis of this fit parameter.

The expression "calibration module", in the context of the invention, indicates a "black-box tool" allowing to determine the localization of the array of microphones. In one preferred embodiment, the calibration module has not been built for exploiting the reverberation. In one preferred embodiment, it is a known method, belonging to the prior art of the present invention.

In one embodiment, the "calibration module" allows to determine the localization of the array of microphones, without knowing the localization of the source(s), nor the localization and/or orientation of the reflective surface(s).

In one preferred embodiment, the calibration module is run for a reduced set of echoes' assignments according to different additional insights or heuristics, or some additional theory, as will be discussed. In one preferred embodiment, calibrating an array of receivers means determining the position of at least one receiver of this array. In this embodiment, the described method allows to determine the position of an object, wherein this object is the receiver(s), and comprises the following steps:

sending a signal by using at least one transmitter receiving by at least one receiver the transmitted signals and the echoes of the transmitted signals as reflected by one or more reflective surfaces sorting the echoes determining the position of the object based on this sorting.

In the previous embodiment it is necessary to know the location and/or the orientation of the reflective surface(s).

In one embodiment, the calibration of the array of receivers is based on the echoes' assignment which minimizes the fit parameter.

The present invention is described in more detail in connection with the minimization of a fit parameter. However the present invention finds applicability also when more than one fit parameter is used. Moreover the calibration can be based on the echoes' assignment which maximizes a fit parameter, or a combination of fit parameters. In general, the calibration can be based on a condition related to one or more values calculated from one or more fit parameters.

According to a particular embodiment, the method according to the invention allows also to determine the location of the transmitter(s) and the location and/or orientation of the reflective surface(s). In one preferred embodiment, the location is an absolute location of the receivers and the source with respect to the reflective surfaces.

In other words, the method according to the invention allows to get valuable information about the reflective surface(s), as well as the transmitter(s). The proposed method could be then considered a total calibration method, in that it allows to partially or completely learn where the receivers are, where the sources are, and where the reflective surfaces are.

If the embodiment in which the array of receivers comprises at least $M_{min}+1$ receivers, wherein $M_{min}$ is the minimum number of receivers required by the calibration module, the method according to the invention can comprise the following steps:

selecting a sub-array of receivers from this array of receivers, this sub-array comprising a number of receivers less that the number of receivers of the array of receivers calibrating the array of receivers based on the signals and echoes received only by the sub-array of receivers.

In this way, it is possible to save the processing power of the computing module(s) performing the calibration method, and/or to reduce the time for calibrating a large array, e.g. an array of receivers comprising at least 10 receivers.

In this way, the calibration module is run only for a sub-set of the echoes' assignments, a fit parameter is computed for each running and an echoes' assignment is chosen on the basis of this fit parameter.

For example if $M_{min}=10$, i.e. if the calibration module needs 10 receivers for performing the calibration, a calibration will be not possible with 9 or less receivers, because that is not enough to do the calibration. But if there are 11 or more receivers, then it is possible to select among these 11 or more receives any subset of 10 receivers.

In one embodiment, the echoes' assignment which minimizes the fit parameter is determined by considering the signals and the echoes received only by the sub-array of receivers. This echoes' assignment is the applied to the whole array of receivers.

In one embodiment, the selection of the sub-array of receivers is based on the knowledge of which receivers of the array of receivers are close in space.

The present invention concerns also a system for calibrating an array of receivers, comprising:

at least one transmitter for sending a signal;

this array of receivers for receiving the transmitted signal and the echoes of the transmitted signals as reflected by one or more reflective surfaces;

a first computing module for sorting the echoes, by assigning each echo to one reflective surface, or to a combination of reflective surfaces;

a second computing module for calibrating the array of receivers based on this sorting.

In one embodiment the first and second computing modules are the same module.

In one preferred embodiment the array of receivers is an array of microphones, the transmitter is a loudspeaker, and each reflective surface is a wall of a room.

In another embodiment the array of receivers is an array of light sensitive devices such as photo diodes or cameras, the transmitter is a light source, and each reflective surface is a mirror.

In another embodiment the transmitter is a mobile device, and each receiver of the array is a mobile device. In such a case each mobile device can comprise the first and/or the second computing modules.

The present invention concerns also a computer program product, comprising:

a tangible computer usable medium including computer usable program code for calibrating an array of receivers, the receivers of the array being configured for receiving a signal transmitted by a transmitter, and echoes of the transmitted signal as reflected by one or more reflective surfaces, the computer usable program code being used for sorting the echoes, by assigning each echo to one reflective surface or to a combination of reflective surfaces;

calibrating the array of receivers based on this sorting.

By duality, the present invention concerns also a method for calibrating an array of transmitters, said method comprising the following steps:

receiving by a receiver signals transmitted by said array of transmitters, and echoes of the transmitted signals as reflected by one or more reflective surfaces sorting said echoes, by assigning each echo to the a reflective surface or to a combination of reflective surfaces calibrating said array of transmitters based on said sorting.

By duality, the present invention concerns also a system for calibrating an array of transmitters, comprising:

said array of transmitters;

a receiver for receiving the signals transmitted by said array of transmitters, and the echoes of the transmitted signals as reflected by one or more reflective surfaces;

a first computing module for sorting said echoes by assigning each of said echoes to one reflective surface or to a combination of reflective surfaces;

a second computing module for calibrating said array of transmitters based on said sorting.

By duality, the present invention concerns also a computer program product, comprising:

a tangible computer usable medium including computer usable program code for calibrating an array of transmitter, said array of transmitter being configured for transmitting signals to a receiver, said receiver being configured for receiving a signal transmitted by said array of transmitters, and echoes of the transmitted signals as reflected by one or more reflective surfaces, the computer usable program code being used for sorting said echoes, by assigning each of said echoes to one reflective surface or to a combination of reflective surfaces;

calibrating said array of transmitters based on said sorting.

The man skilled in the art can easily apply by duality all the considerations made about a source and an array of receivers, to a receiver and an array of sources.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The present invention will be now described in more detail in connection with its embodiment for calibrating an array of microphones (or, in general, of receivers).

The present invention will be now described in more detail in connection with an audio signal. However the present invention finds applicability of connection with other kinds of signals, e.g. and in a non-limiting way a light signal, a RF signal, an UWB signal, an ultrasound signal, etc.

The present invention will be now described in more detail in connection with a room. However the present invention does not necessarily need to be applied in a closed room. The presence of one or more reflective surfaces is sufficient.

Figure 1:
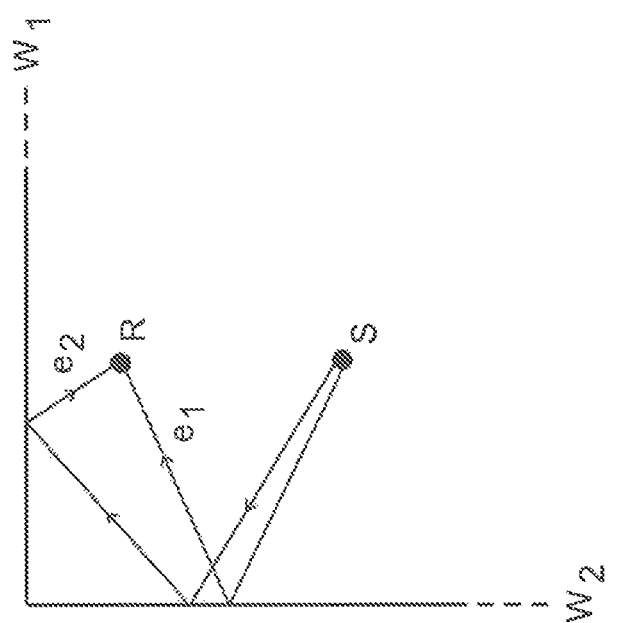
FIGS. 1 and 2 show a view of a room comprising a source or transmitter and a receiver.

The first and second order echoes concept is described in FIG. 1.

FIG. 1 illustrates a room defined by the walls w1, w2 and by other walls not represented and comprising a source or transmitter s and a receiver r. The source can be for example and in a non-limitative way a loudspeaker and the receiver a microphone. The walls are reflective surface, i.e. a surface allowing a signal to be reflected, the angle at which the signal is incident on this surface being equal to the angle at which it is reflected.

A first audio signal transmitted by the source s is reflected by the wall w2. The reflected signal or echo e1 is then received by the receiver r. Since there is a single reflection of the transmitted signal before its reception by the receiver r, the echo e1 is a first-order echo. A second audio signal transmitted by the source is reflected first by the wall w2 and after by the wall w1; the reflected signal or echo e2 is then received by the receiver r. Since there are two reflections of the transmitted signal before its reception by the receiver r, the echo e2 is a second-order echo.

The time of arrival (TOA) is defined as the travel time from a source s to a receiver r. The audio signals e1 and e2 can have different times of arrival (TOAs).

In the context of the present invention the expression "time of arrival" or "TOA" indicates the absolute propagation time of an echo between the transmitter and the receiver, or the difference of the time of arrival of an echo from the time of arrival of another echo (reference). In the first case the transmitter and the receiver are synchronised, in the second case they are not synchronized.

Figure 2:
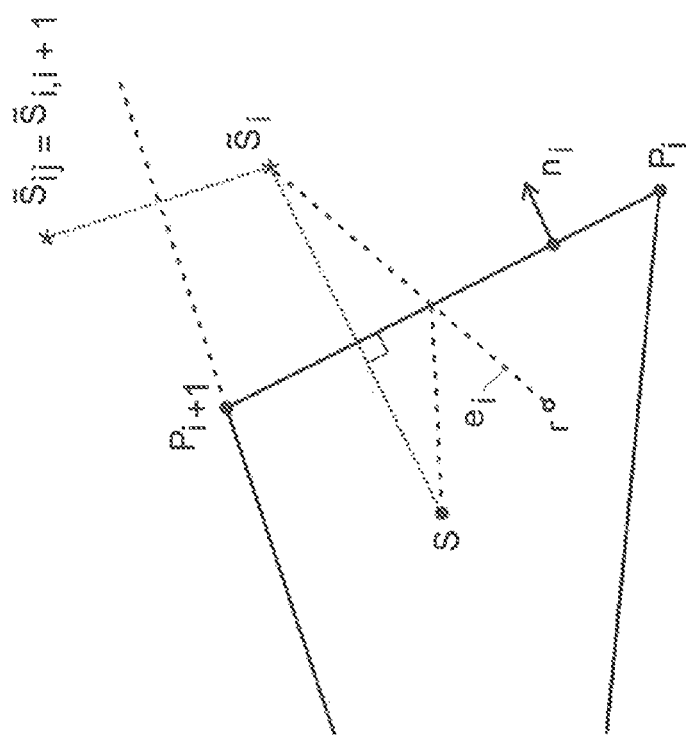

FIG. 2 illustrates a system comprising a room defined by some walls (for sake of clarity only three walls are represented), a source or transmitter s and a receiver r. The points $p_i$ and $p_{i+1}$ are the end-points of the $i_{th}$-wall, $n_i$ is its unit, outward pointing normal and $\tilde{s}_i$ is an image source; in fact the signal $e_i$ received by the receiver r could be considered as generated by the image or virtual source $\tilde{s}_i$ which is the mirror image of the source s with respect to the wall defined by the points $p_i$ and $p_{i+1}$. $\tilde{s}_i$ is a first generation image source as the signal $e_i$ received by the receiver r has been reflected once by the wall. In other words $\tilde{s}_i$ is a first generation image source as $e_i$ is a first-order echo.

$\tilde{s}_{ij}$ is the image of $\tilde{s}_i$ with respect of the wall (i+1). It is then a second generation image source, generating a second-order echo.

The virtual sources $\tilde{s}_i$ or $\tilde{s}_{ij}$ are not real, tangible and concrete sources as the "real" source s. In other words they are abstract objects used for studying the signal reflections, according to the well known image-source theory, used e.g. in optics.

The method according to the invention uses the image source model. The idea in the image source model is that if there is a sound source on one side of the wall, then the sound field on the same side can be represented as a superposition of the original sound field and the one generated by a mirror image of the source with respect to the wall.

In the case of FIG. 2 the following relation is valid $$\tilde{s}_i = s + 2(p_i - s_i n_i) n_i$$

By observing the impulse response and doing appropriate computations it is possible to access the first-order echoes, but also higher-order echoes.

In other words the sound propagation inside a space defined by one or more reflective surfaces, e.g. a room, can be modelled by the room impulse response (RIR). An RIR describes the acoustic channel between the source s and the receiver r inside the room. It depends on the shape of the room and locations of the loudspeaker s and the microphone r. Ideally, it is a train of Diracs, each corresponding to an echo:

$$h(t) = \sum_i c_i \delta(t - t_i)$$

where $c_i$ and $t_i$ are the amplitude and time of arrival of the ith echo.

As described, the loudspeaker s does not need to be synchronized with the microphone r, as it is possible to only measure differences of times of arrival of the echoes to the microphone r due to the lack of synchronization.

If the loudspeaker s and the microphone r are synchronised, the time of arrival corresponds to the absolute propagation times of the signal between the loudspeaker s and the microphone r.

The microphone r hears the convolution of the signal transmitted by the loudspeaker s with the RIR. By measuring the RIR it is possible to access the echo times $t_i$. These echo times can be linked to the room geometry and the microphone location with the image source model. According to this model, it is possible to replace an echo from a wall by a virtual source behind the wall in a mirrored location of the original source.

The described image source model is used for calibrating an array of receivers, e.g. an array of microphones.

The inventive method exploits the use of a known calibration module or method, e.g. the calibration method described in M. Pollefeys and D. Nister, "*Direct computation of sound and microphone locations from time-difference-of-arrival data,*" in IEEE int. Conf. on Acoustic Speech, and Signal Processing, 2008, pp. 2445-2448 as a black-box building block.

Any other known calibration module or method can be used as a building block of the present method.

As discussed, known calibration modules or methods do not exploit at all the reverberation.

Figure 3:
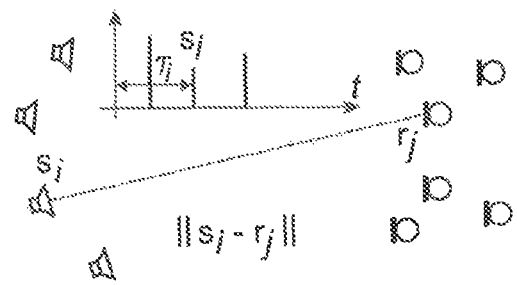
FIG. 3 shows a view of an array of receivers and an array of transmitters, used for performing a calibration without exploiting the reverberation.

FIG. 3 shows a view of an array of receivers $r_j$ and an array of transmitters or sources $s_i$, used for performing a calibration without exploiting the reverberation.

In the illustrated example, the sources $s_i$ produce some impulsive sound whose arrival times $\tau_i$ can be precisely measured by the receivers $r_j$. In general, the sources $s_i$ can produce any kind of signal allowing to estimate the impulse response between the sources and the microphones.

In one preferred embodiment the receivers $r_j$ are synchronized. However, as discussed, the synchronisation is not necessary for the working of the system.

The location of the array of receivers $r_j$ is unknown, the location of the array of sources $s_i$ is unknown, and the location of one or more reflective surfaces (not illustrated) is unknown as well.

The array of receivers $r_j$ measures then $$\theta_{ij} = c\tau_i + \|s_i - r_j\|_2.$$

where
$\{s_k\}_{k=1}^K$ denotes the source positions
$\{r_m\}_{m=1}^M$ denotes the the microphone positions
$\tau_i$ the offset time associated with the ith source.
Thus it is possible to measure the matrix $\Theta = (\theta_{ij})$.

A calibration module (black box), named "Calibrate", that computes the unknown locations $\{r_m\}$, $\{s_k\}$, and offset $\{\tau_k\}$ from $\{\theta_{ij}\}$ is then selected.

It is possible then to write $$(\hat{R}, \hat{S}, \hat{\tau}, \epsilon) = \text{Calibrate}(\Theta)$$

where $\epsilon \geq 0$ is a fit parameter, denoting some measure of fit. If $\hat{R}$, $\hat{S}$ and $\hat{\tau}$ perfectly generate $\Theta$, then $\epsilon = 0$. The symbol "^" over R, S and $\tau$ indicates an estimation of R, S respectively $\tau$.

The measure of fit $\epsilon$ is computed as the discrepancy between the measured data, and the data that would have been generated by receivers at estimated positions:

$$\varepsilon = \sum_{k=1}^{K}\sum_{m=1}^{M} |\vartheta_{km} - (\|s_k - r_m\|_2 + c\tau_k)|^2$$

Associated with the component "Calibrate" is the minimal number of microphones $M_{min}$ and sources $K_{min}$ required for estimation. In other words, the choice of the module "Calibrate" determines the minimal number of microphones $M_{min}$ and sources $K_{min}$ necessary for performing the calibration. The minimal dimensions of $\Theta$ are then $K_{min} \times M_{min}$.

The present invention is based on the observation that in a room (or more generally, in the presence of one or more reflective surfaces), the acoustic sources $\{s_k\}$ generate reflections equivalent to virtual sources.

The present invention is based on exploitation of these additional sources, normally considered an annoyance.

Figure 4:
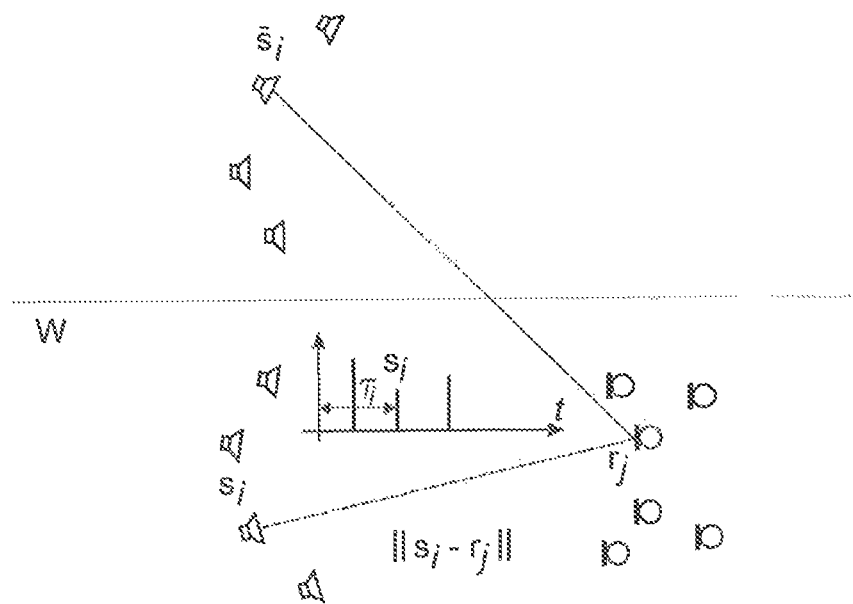
FIG. 4 shows a view of an array of receivers and an array of transmitters, used for performing a calibration by exploiting the reverberation.

FIG. 4 shows a view of an array of receivers $r_j$ and an array of transmitters or sources $s_i$, used for performing a calibration by exploiting the reverberation. For sake of simplicity, a single reflective surface w is illustrated.

A challenge that appears in this setting is that it is not possible to address each virtual source $\tilde{s}_i$ individually, as they are not labelled. Moreover in the presence of multiple reflective surfaces, they are heard by the array of receivers in different orders.

It is then necessary to perform an echo sorting. However in this case, the (relative) geometry of the array of the receivers is not known.

The goal is to find the best fit among all possible echo assignments. This can be achieved by running the module "Calibrate" for all echo assignments, and taking as the correct assignment the one with the smallest $\epsilon$.

In one embodiment, only the echoes received by the array of receivers in a first temporal window are considered, regardless their order.

In another embodiment, a second temporal window will be used so as to reduce the number of combinations for echo sorting. That second window can depend on the largest dimension of the array of receivers.

Performing the combinatorial search may be feasible for arrays with small number of receivers, e.g. comprising less than 10 receivers. For large arrays of receivers, e.g. comprising more than 10 receivers, e.g. 20, 100 or more, however, the number of combinations could become too big for the processing power of the computing module. If e.g. the computing module belongs to a mobile device, probably a fixed computer will be necessary.

In this case, it is also possible to bootstrap the method by first running it for one or more sub-arrays of the array of receivers. In one preferred embodiment it is possible to have an idea about groups of receivers that are spatially close (e.g. this will be the case for large fixed arrays). Knowing which microphones are close in space is relevant, as proximity makes it more likely that the microphones will have picked up the same echoes, and in the same order. In spatially large arrays, it is not guaranteed that all the microphones will hear all the echoes.

If any information about the array at all is available, different strategies and heuristics can be used to sample several sub-arrays from the whole array of receivers. It is possible to do it randomly, or by exploiting some conditions. For example, a necessary (but not sufficient) condition that the microphones be close is that they receive the pukes at similar time instants.

In one preferred embodiment the calibration can be performed one acoustic event at a time (e.g. a finger snap). This means that the echoes corresponding to different acoustic events will not overlap, as they will overlap only within one event. This is useful, as it is possible to know that the time offset $\tau$ will be the same for all virtual events corresponding to a single real event (and it will be equal to the offset of that event). Structured information like this can be exploited for modifying the "Calibrate" module.

Here below there is an example of an embodiment of the method according to the invention:

| Algorithm 1 Basic indoor calibration | |
|---|---|
| Input: | ▷ Signals received by the microphones $\{y_m(t)\}_{m=1}^M$ |
| Output: | ▷ Microphone positions $r_m$ |
| | ▷ Source positions $s_k$ |
| | ▷ Unknown offsets $\tau$ |

-continued

---
Algorithm 1 Basic indoor calibration
---

Peak picking:
 ▷ For every $y_m(t)$ find the set of peaks (echoes), $T_m$
Initialization:
 ▷ $\varepsilon_{best} \leftarrow \infty$
For every echo assignment across $\{T_m\}$:
 ▷ Create the corresponding matrix $\Theta$
 ▷ (R, S, τ, ε) = Calibrate($\Theta_i$)
 ▷ If ($\varepsilon < \varepsilon_{best}$), then $(R_{best}, S_{best}, \tau_{best}, \varepsilon_{best}) \leftarrow$ (R, S, τ, ε)
End For

---

▷ Once the correct echo assignment is learned, apply it to the whole array (in case subarrays were used).

As discussed, the method according to the invention allows to reduce the number of sources required for calibration. For example the calibration method described in M. Pollefeys and D. Nister, "*Direct computation of sound and microphone locations from time-difference-of-arrival data,*" in *IEEE Int. Conf. on Acoustic, Speech, and Signal Processing*, 2008, pp. 2445-2448 suggests to use at least four sources for calibrating an array of 10 microphones. The method according to the invention allows to use for the same calibration algorithm 1 source only, placed in a room comprising reflective walls, and to exploit the at least 3 virtual sources representing the echoes received by the array of microphones. In this case only a single emission time needs to be estimated, as it will be the same for all the image sources.

Figure 5:
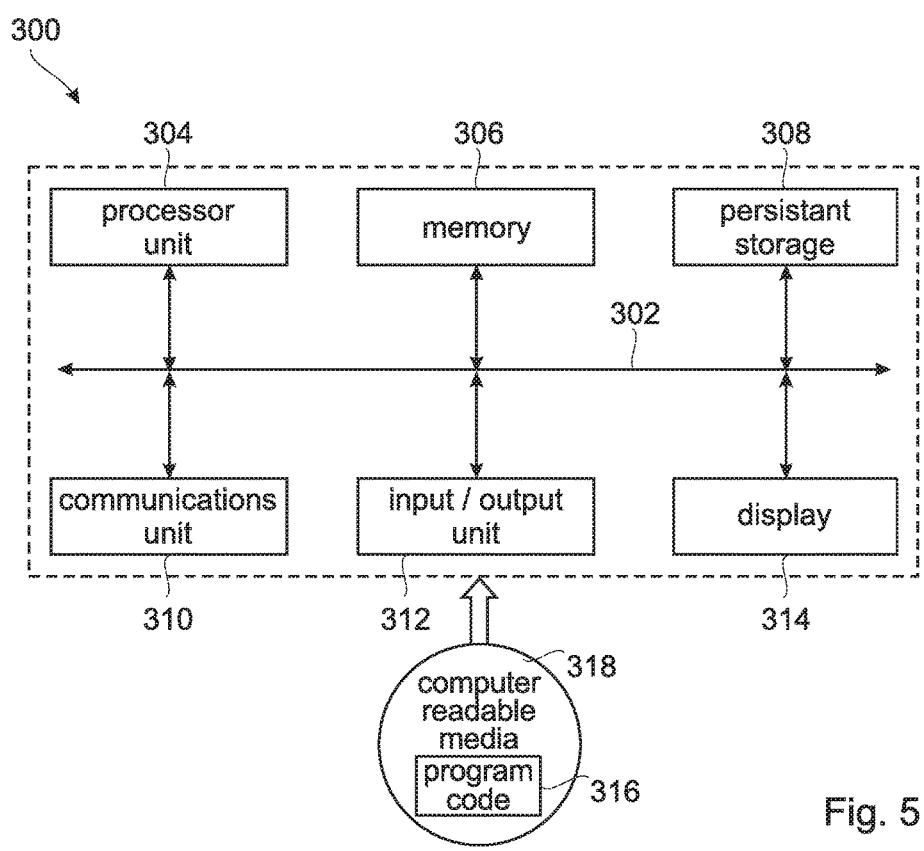
FIG. 5 illustrates an embodiment of a data processing system in which a method in accordance with an embodiment of the present invention, may be implemented.

FIG. 5 is an embodiment of a data processing system 300 in which an embodiment of a method of the present invention may be implemented. The data processing system 300 of FIG. 5 may be located and/or otherwise operate at any node of a computer network, that may exemplarily comprise clients, servers, etc., and it is not illustrated in the Figure. In the embodiment illustrated in FIG. 5, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, the processor unit 304 may be a symmetric multi-processor system containing multiple processors of the same type.

In some embodiments, the memory 306 shown in FIG. 5 may be a random access memory or any other suitable volatile or non-volatile storage device. The persistent storage 308 may take various forms depending on the particular implementation. For example, the persistent storage 308 may contain one or more components or devices. The persistent storage 308 may be a hard drive, a flash memory, a rewritable optical disk, a rewritable magnetic tape, or some combination of the above. The media used by the persistent storage 308 also may be removable such as, but not limited to, a removable hard drive.

The communications unit 310 shown in FIG. 5 provides for communications with other data processing systems or devices. In these examples, communications unit 310 is a network interface card. Modems, cable modem and Ethernet cards are just a few of the currently available types of network interface adapters. Communications unit 310 may provide communications through the use of either or both physical and wireless communications links.

The input/output unit 312 shown in FIG. 5 enables input and output of data with other devices that may be connected to data processing system 300. In some embodiments, input/output unit 312 may provide a connection for user input through a keyboard and mouse. Further, input/output unit 312 may send output to a printer. Display 314 provides a mechanism to display information to a user.

Instructions for the operating system and applications or programs are located on the persistent storage 308. These instructions may be loaded into the memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on the computer readable media 318 that is selectively removable and may be loaded onto or transferred to data processing system 300 for execution by processor unit 304. Program code 316 and computer readable media 318 form a computer program product 320 in these examples. In one example, the computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, the computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, the program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 5 can be varied from the illustrative examples shown. For example, a storage device in data processing system 300 is any hardware apparatus that may store data. Memory 306, persistent storage 308, and computer readable media 318 are examples of storage devices in a tangible form.

Therefore, as explained at least in connection with FIG. 5 the present invention is as well directed to a system for determining the geometry and/or the localisation of an element, a computer program product for determining the geometry and/or the localisation of an element and a computer data carrier.

In accordance with a further embodiment of the present invention is provided for a computer data carrier storing presentation content created while employing the methods of the present invention.

The invention claimed is:

1. A method for determining the position of at least one microphone of an array of microphones, each microphone being configured to receive a signal transmitted by at least one loudspeaker, and echoes of the transmitted signal as reflected by one or more reflective surfaces, said method comprising the following steps:
   Receiving, in a processor, an impulse response measured at the array of microphones, wherein the impulse response contains the echoes of the transmitted signal, wherein each of the echoes corresponds substantially to a Dirac in the impulse response,
   Sorting, in the processor, said echoes of the impulse response, by assigning each echo to one reflective surface or to a combination of reflective surfaces; wherein the step of sorting said echoes by assigning each echo to one reflective surface or to a combination of reflective surfaces, comprises selecting a subset of echo assignments from a set of all possible echo assignments, determining it that selected subset of echo assignment is valid by checking if the times of arrival of all of the echoes in the selected subset satisfy a predefined system of equations;
   Determining, in the processor, the position of at least one of the microphones in the array based on the assignments of the echoes to the corresponding reflective surfaces.

2. The method according to claim 1, wherein said sorting comprises:
   selecting a set of echoes from the echoes as received by the microphone;
   assigning each echo of the set to one reflective surface or to a combination of reflective surfaces.

3. The method according to claim 2, wherein said determining the on of at least one of the microphones comprises:
   selecting a calibration module among a number of calibration modules;
   running said calibration module for all the echoes' assignments:
   calculating for each running a fit parameter;
   selecting an echoes' assignment on the basis of said fit parameter.

4. The method according to claim 3, further comprising:
   selecting the echoes' assignment which minimizes said fit parameter.

5. The method of claim 3 comprising:
   determining the location of the transmitter(s) based on the selected echoes' assignment.

6. The method of claim 3 comprising:
   determining the location and/or orientation of the reflective surface(s) based on the selected echoes' assignment.

7. The method of claim 6, the array of receivers comprising at least $M_{min}+1$ receivers, wherein $M_{min}$ is the minimum number of microphones required by the calibration module, the method comprising:
   selecting a sub-array of microphones from said array of receivers, said sub-array comprising a number of microphones less that the number of receivers of said array of receivers;
   determining the position of said array of microphones based on the signals and echoes received only by said sub-array of receivers.

8. The method according to claim 7, wherein said selecting is based on the knowledge of which microphones of the array of microphones are close in space.

9. The method of the claim 1, wherein the location and/or the orientation of the reflective surfaces is known.

10. The method of claim 1, said signal being an acoustic signal.

11. The method of claim 10, said reflective surface being a wall of a room.

12. A method according to claim 1, wherein the position of at least one of the receivers in the array is determined based on the time of arrivals or time difference of arrival of the echoes and based on the assignments of the echoes to the corresponding reflective surfaces.

13. A system for determining the position of at least one receiver of an array of receivers, to find the absolute or the relative location of the receivers in an array of receivers, comprising:
   at least one transmitter for sending a signal;
   said array of receivers for receiving an impulse response containing the transmitted signal and the echoes of the transmitted signals as reflected by one or more reflective surfaces, wherein each of the echoes corresponds substantially to a Dirac in the impulse response;
   a processor for sorting said echoes of the impulse response by assigning each of said echoes to one reflective surface or to a combination of reflective surfaces, wherein the first computing module is configured to sort said echoes by assigning each echo to one reflective surface or to a combination of reflective surfaces, by selecting a subset of echo assignments from a set of all possible echo assignments, and determining if that selected echo assignment is valid by checking if the times of arrival of all of the echoes in the selected subset satisfy a predefined system of equations;
   the processor further configured for determining the position of at least one of the receivers in the array based on the assignments of the echoes to the corresponding reflective surfaces,
   wherein in a first embodiment, the receivers are microphones, the transmitter is a loudspeaker and signal is an acoustic signal or in a second embodiment, the receivers and the transmitter are mobile devices and the signal is an RF signal or in a third embodiment, said transmitter is a light source, said array of receivers is an array of light sensitive devices as a photo diodes or cameras and said signal is a light signal.

14. The system of claim 13, said reflective surface being a wall of a room.

15. The system of claim 13, said reflective surface being a mirror.

16. A computer program product, comprising:
   a tangible non-transitory computer usable medium including computer usable program code for determining the position of at least one receiver of an array of receivers, said receivers of the array being configured for receiving a signal transmitted by a transmitter, and echoes of the transmitted signal as reflected by one or more reflective surfaces, the computer usable program code performs the following steps, when executed on a processor:
   Receiving, in the processor, an impulse response measured at the array of receivers, wherein the impulse response contains the echoes of the transmitted signal, wherein each of the echoes corresponds substantially to a Dirac in the impulse response;

Sorting, in the processor, said echoes of the impulse response, by assigning each of said echoes to one reflective surface or to a combination of reflective surfaces, wherein the sorting said echoes by assigning each echo to one reflective surface or to a combination of reflective surfaces, comprises selecting a subset of echo assignments from a set of all possible echo assignments, determining that if selected echo assignment is valid by checking if the times of arrival of all of the echoes in the selected subset satisfy a predefined system of equations;

Determining, in the processor, the position of at least one of the receivers in the array based on the assignments of the echoes to the corresponding reflective surfaces wherein in a First embodiment, the receivers are microphones, the transmitter is a loudspeaker and said signal is an acoustic signal or in a second embodiment, the receivers and the transmitter are mobile devices and the signal is an RF signal or in a third embodiment, said transmitter is a light source, said array of receivers is an array of light sensitive devices as a photo diodes or cameras and said signal is a light signal.

17. A method for determining the position of at least one receiver of an array of receivers, each receiver being configured for receiving a signal transmitted by at least one transmitter, and echoes of the transmitted signal as reflected by one or more reflective surfaces, said method comprising the following steps:

Receiving, in a processor, an impulse response measured at the array of microphones, wherein the impulse response contains the echoes of the transmitted signal, wherein each of the echoes corresponds substantially to a Dirac in the impulse response;

Sorting, in the processor, said echoes received by the array of receivers, by assigning each echo to one reflective surface or to a combination of reflective surfaces;

wherein said sorting comprises:

selecting a set of echoes from the echoes as received by the receiver;

assigning each echo of the set to one reflective surface or to a combination of reflective surfaces;

wherein the method comprises further the step of determining, in the computing module, the position of at least one of the receivers in the array based on the assignments of the echoes to the corresponding reflective surfaces, wherein the step of determining the position comprises:

selecting a calibration module among a number of calibration modules;

running said calibration module for all the echoes' assignments;

calculating a fit parameter for each running of said calibration module;

selecting an echoes' assignment on the basis of said fit parameter wherein in a first embodiment, the receivers are microphones, the transmitter is a loudspeaker and said signal is an acoustic signal or in a second embodiment, the receivers and the transmitter are mobile devices and the signal is an RF signal or in a third embodiment, said transmitter is a light source, said array of receivers is an array of light sensitive devices as a photo diodes or cameras and said signal is a light signal.

18. A method according to claim 17 wherein the fit parameter is calculated as the discrepancy between the measured data, and the data that would have been generated by receivers at estimated positions.

* * * * *